Figure 1:
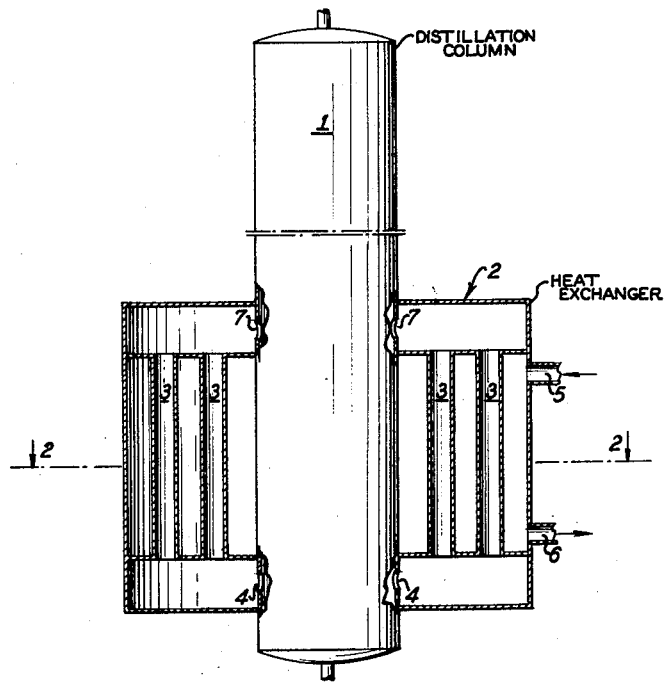

April 6, 1965  H. A. HUCKINS, JR  3,177,129
DISTILLATION COLUMN AND REBOILER
Filed July 3, 1961  2 Sheets-Sheet 1

INVENTOR
HAROLD A. HUCKINS, JR.

BY William C. Long
ATTORNEY

April 6, 1965 H. A. HUCKINS, JR 3,177,129
DISTILLATION COLUMN AND REBOILER
Filed July 3, 1961 2 Sheets-Sheet 2

INVENTOR
HAROLD A. HUCKINS, JR.
BY William C. Long
ATTORNEY

United States Patent Office 3,177,129
Patented Apr. 6, 1965

3,177,129
DISTILLATION COLUMN AND REBOILER
Harold A. Huckins, Jr., New Canaan, Conn., assignor to Halcon International, Inc., a corporation of Delaware
Filed July 3, 1961, Ser. No. 121,619
1 Claim. (Cl. 202—153)

This invention is directed to an improved distillation apparatus. More specifically, the invention is directed to an improved distillation column-reboiler apparatus.

In distillation processes involving the transmission of heat by indirect means at the base of large diameter distillation columns, it has been found necessary to install a number of reboilers to provide the heat transfer requirements. This arrangement requires a multiplicity of large diameter pipes, the support of the multiple reboilers, and the cost of containing the heat transfer medium in the shell side of the reboilers. The reboilers must be located close to the distillation columns in order to minimize pressure drop and pipe diameter size. Also, ground area requirements are substantially increased, thus increasing plant costs.

It is an object of the present invention to provide an improved distillation apparatus.

It is a particular object of the invention to provide an improved distillation column-reboiler combination.

It is an object of the present invention to provide an apparatus comprising a distillation column, reboiler means located at the lower part of the distillation column, and adapted to provide heat by indirect heat exchange to the distillation column, said reboiler means and said distillation column together defining a passage for the circulation of heat transfer fluid therethrough.

It is a further object of the present invention to provide an apparatus comprising a distillation column and external reboiler means located at the lower part of the distillation column and adapted to provide heat by indirect heat exchange to the distillation column, said reboiler means being attached to the outer column wall thus defining with the distillation column a passage for the circulation of transfer fluid.

It is a still further object of the present invention to provide an apparatus comprising a distillation column, internal reboiler means located at the lower part of the distillation column and positioned within the distillation column said reboiler means being adapted to provide heat by indirect heat exchange to the distillation column, said reboiler means being attached to the inner wall of the distillation column and together with the distillation column defining a passage for the circulation of heat transfer fluid.

Other objects of the invention will be apparent from the following description.

Figure 2:
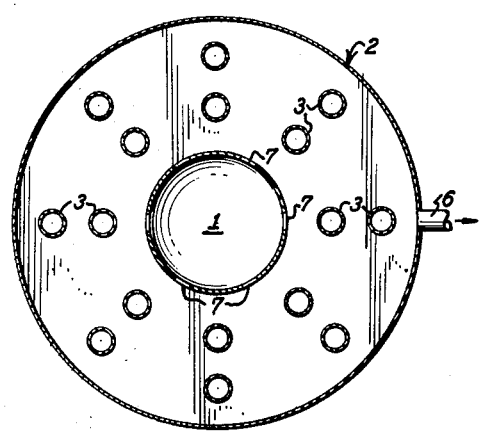
Figure 3:
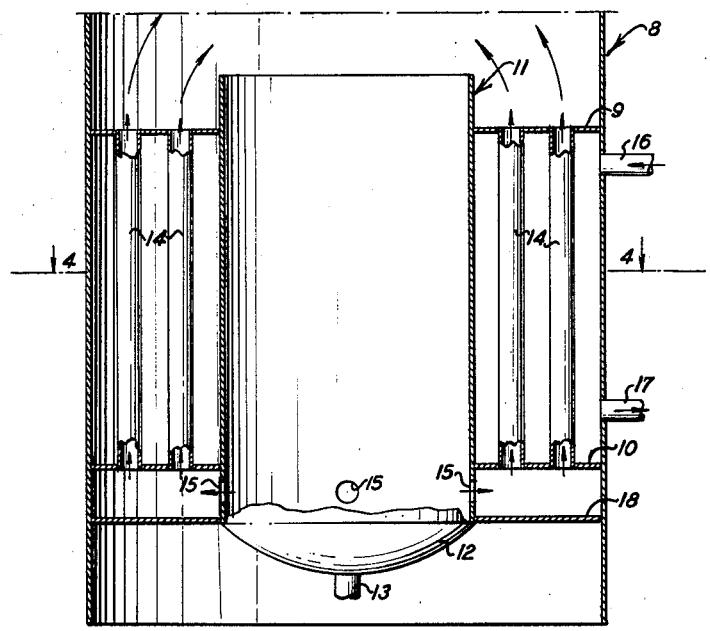
Figure 4:
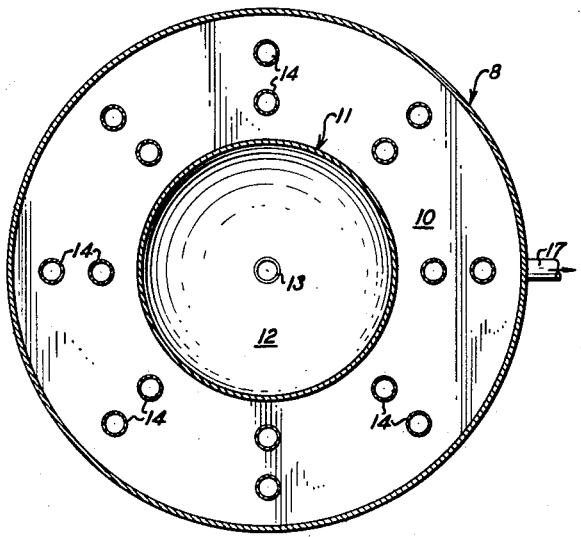

FIGURE 1 of the attached drawings is an elevation view of a preferred apparatus of the invention. FIGURE 2 illustrates schematically in plan view the same embodiment of the present invention. FIGURES 3 and 4 illustrate another embodiment of the invention.

Referring to FIGURES 1 and 2, distillation column 1 is a conventionaly, large diameter fractional distillation column. Positioned near the bottom of the distillation column is heat exchanger 2 which is adapted to provide heat by indirect heat exchange to the fractional distillation column.

Heat exchanger 2 comprises a plurality of tubes 3 positioned therein and adapted for the flow therethrough of liquid from distillation column 1. This liquid flows through apertures 4, into the heat exchanger 2. The liquid flows upwardly through the tubes 3, and while passing upwardly through the said tubes 3, the liquid is heated and at least partially vaporized by indirect heat exchange with a heating medium which passes through the shell side of exchanger 2.

The heated material from the distillation column passes out the top of the tubes 3 and is returned to column 1 through apertures 7. The heat exchanger 2 is provided with inlet means 5 and outlet means 6 through which the heating medium passes. Preferably, the heating medium enters the exchanger 2 as a vapor through inlet 5. This vapor passes around the tubes 3 and by indirect heat exchange heats the liquid passing through tubes 3. Upon being cooled, the vapor condenses and the condensate is removed from exchanger 2 through outlet 6.

In addition to the external reboiler arrangement above described, various other embodiments are within the scope of this invention. Considering now FIGURES 3 and 4 the apparatus therein represented is illustrative of an internal type reboiler-distillation column apparatus of the present invention.

Referring to FIGURES 3 and 4, distillation column 8 represents a conventional, large diameter distillation column such as is commonly employed in the separation of materials by fractional distillation. Welded to the inner wall of distillation column 8 are rings 9 and 10 which actually are tube sheets and ring 18. Welded to rings 9, 10 and 18 is cylinder 11, the upper portion of which extends above ring 9 as illustrated in the drawing. Head 12 is appropriately fastened to the lower part of the cylinder 11. Opening 13 is provided in the lower part of this head in order to permit the passage therethrough of liquid.

Tubes 14 are rolled in the rings 9 and 10 as illustrated in the drawing. Apertures 15 in the lower part of cylinder 11 are provided for the passage therethrough of liquid which is to be heated by indirect heat exchange. The liquid passes through apertures 15 and then upwardly through tubes 14 wherein it is heated and at least partially vaporized. Openings 16 and 17 are provided respectively for the admission and withdrawal of the heat transfer medium which is employed to accomplish the indirect heating of the liquid in the distillation column.

It will be apparent to those skilled in the art that various other modifications can be made while remaining within the scope of this invention.

The apparatus of this invention represents a distinct improvement over conventional reboiler arrangements. The relatively simple apparatus of the invention is considerably less expensive than the plurality of reboilers which are needed to accomplish equivalent heat transfer in accordance with prior art techniques. The support problems which are associated with prior methods of mounting reboilers at the base of a column are substantially overcome. The amount of steel shell to contain the heat transfer medium on the shell side of the reboiler is minimized and the distillation column wall serves as part of the heat exchanger shell. The ground area requirements at the base of the distillation column are minimized. Finally, residence time for the material being vaporized in the reboiler is minimized, thereby avoiding thermal degradation of product streams.

The apparatus of the invention can be employed to accomplish many distillation separations, including the separation of ethylene and ethane, propylene and propane, ethyl benzene and xylene, ethyl benzene and styrene, butylene and butane, and the like.

It will be apparent that various modifications can be made in the apparatus of the present invention depending on the particular use and application of the apparatus. Thus, the number and size of the tubes can be varied as can the diameter and other dimensions of the various apparatus components.

Although the present apparatus is of particular value in applications involving the use of large diameter distillation column, the present inventive apparatus also has applicability in connection with smaller diameter distillation columns. Especially where heat sensitive materials are treated, the invention is distinctly advantageous since the residence times at elevated temperatures of the process fluids to be reboiled are minimized through practice of the present invention.

I claim:

A distillation apparatus which comprises: a distillation column having a vertically disposed column wall and having a substantially constant cross-section; a reboiler defined by and surrounding the outer surface of a lower part of said column wall and having an outside diameter greater than said column diameter; a plurality of inlets defined by the lower portion of the surrounded column wall adapted to permit the flow of fluids from said distillation column to said reboiler; a plurality of outlet means defined by the upper portion of said surrounded column wall; heating means in said reboiler intermediate to said inlet and outlet means; passage means juxtaposed to said heating means and adapted to permit the flow of fluids upwardly from said inlet to said outlet means.

References Cited by the Examiner
UNITED STATES PATENTS

| | | | |
|---|---|---|---|
| 881,990 | 3/08 | Zaremba | 159—27 |
| 2,494,767 | 1/50 | Lindsay | 159—27 |
| 2,547,684 | 4/51 | Bourdon | 202—153 |
| 2,750,999 | 6/56 | De Vries | 159—18 |

NORMAN YUDKOFF, *Primary Examiner.*

GEORGE D. MITCHELL, ALPHONSO D. SULLIVAN, *Examiners.*